H. B. PAGE.
DIRIGIBLE HEADLIGHT FOR MOTOR VEHICLES.
APPLICATION FILED OCT. 11, 1920.
1,400,975.
Patented Dec. 20, 1921.
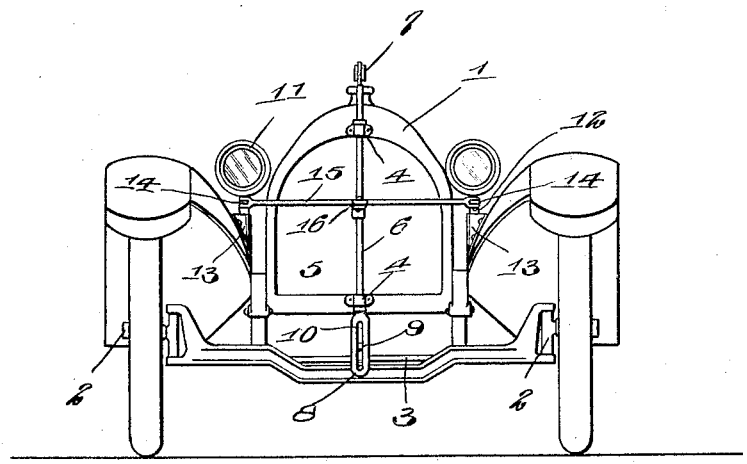
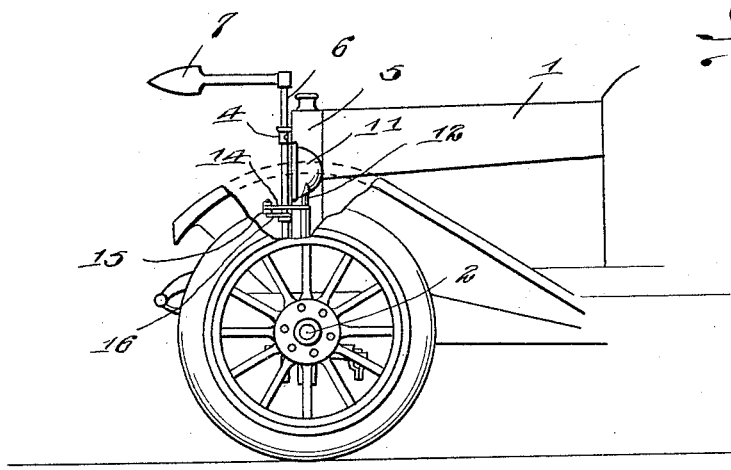
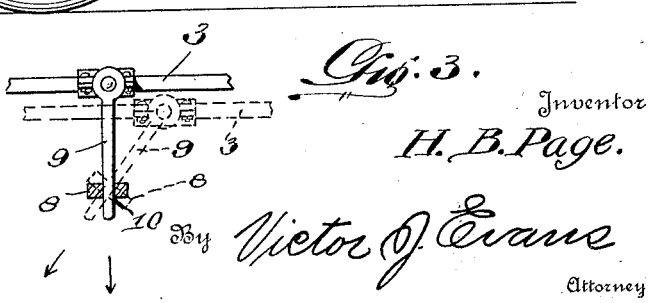
Witnesses:—
Inventor
H. B. Page.
By Victor J. Evans
Attorney

UNITED STATES PATENT OFFICE.

HENRY BENJIMAN PAGE, OF GREENVILLE, MISSISSIPPI.

DIRIGIBLE HEADLIGHT FOR MOTOR-VEHICLES.

1,400,975.  Specification of Letters Patent.  Patented Dec. 20, 1921.

Application filed October 11, 1920. Serial No. 415,990.

*To all whom it may concern:*

Be it known that I, HENRY B. PAGE, a citizen of the United States, residing at Greenville, in the county of Washington and State of Mississippi, have invented new and useful Improvements in Dirigible Headlights for Motor-Vehicles, of which the following is a specification.

This invention relates to headlights of motor vehicles and has for its object the provision of an attachment to the direction signal device shown in my Patent No. 1,290,648, granted January 7th, 1919, this patent showing a direction indicator operated by movement of the steering wheels and the present attachment including rotatable lamps and a connecting rod connecting the lamps and connected with the signaling device shown in the above mentioned patent.

An important object is the provision of an attachment of this character by which the lamps will be moved in accordance with the movement of the front wheels whereby to throw the light directly in the path of travel of the vehicle, a particularly advantageous feature especially in making sharp turns.

A further object is the provision of an attachment of this character which will be extremely simple and inexpensive in manufacture and installation, which will be highly efficient and positive in use, and a general improvement in the art.

With the above and other objects and advantages in view, the invention consists in the details of construction to be hereinafter more fully described and claimed, and illustrated in the accompanying drawings in which—

Figure 1 is a front elevation of a motor vehicle equipped with my dirigible headlight connection shown associated with my signaling device, Fig. 2 is a side elevation with parts broken away to more clearly illustrate the structure, and Fig. 3 is a detail view.

Referring more particularly to the drawing, the numeral 1 designates the front portion of a motor vehicle, 2 designates the front wheel spindles, 3 designates the steering arm connecting rod. Journaled in suitable brackets 4 upon the front of the radiator 5 is a rod 6 carrying a signal arm 7. At its lower end the rod 6 is widened, as shown at 8, and provided with a slot 10 within which is engaged an arm 9 extending from a clamping member secured upon the steering arm connecting rod 3. The above described parts constitute the indicating signal structure shown in my patent above referred to.

In carrying out the present invention which is designed as an attachment to the above structure, the headlights 11 have their stems 12 rotatably mounted in sockets 13 secured upon the vehicle frame, the radiator, or the fenders, as the case may be, depending upon the type of vehicle. The stem 12 of each headlamp is provided with a forwardly extending arm 14 and these arms are connected by a rod 15 which is connected with a forwardly extending arm 16 on the signal rod 6.

In the operation of the device it will be seen that as the front wheels are turned and the spindles 2 correspondingly turned, by means of the rod 3, the rod 6 will be partially rotated. This rotary movement of the rod 6 will result in longitudinal movement of the rod 15 which will result in turning the headlamps 11 so that they will be disposed in the same direction as the wheels and will throw their light directly in the path of travel of the vehicle.

From the foregoing description and a study of the drawings it will be apparent that I have thus provided an extremely simple and inexpensive dirigible headlight construction which will be very efficient in operation, not likely to get out of order, and a general improvement in the art.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

The combination with a signaling device for an automobile, the signaling device including a vertical rod journaled in advance of the radiator and provided at its lower end with a vertical slot, a signal member on the upper end of said rod, and a forwardly extending operating arm clamped upon the steering arm connecting rod; a dirigible head lamp construction including a pair of head lamps rotatably mounted in brackets secured upon the automobile frame, the standards of the lamps being provided with forwardly extending arms connected by a rod, and a forwardly extending arm secured upon said vertical rod and pivotally connected with said last named connecting rod whereby the operation of the signal member and the turning of the head lamps will be simultaneous.

In testimony whereof I affix my signature.

HENRY BENJIMAN PAGE.